(12) United States Patent
Inam et al.

(10) Patent No.:  US 12,628,006 B2
(45) Date of Patent:  May 12, 2026

(54) NETWORK NODE AND A METHOD PERFORMED IN A WIRELESS COMMUNICATION NETWORK FOR HANDLING CONFIGURATION OF RADIO NETWORK NODES USING REINFORCEMENT LEARNING

(71) Applicant: Telefonaktiebolaget LM Ericsson (publ), Stockholm (SE)

(72) Inventors: Rafia Inam, Västerås (SE); Kaushik Dey, Kolkata (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 18/023,857

(22) PCT Filed: Sep. 23, 2020

(86) PCT No.: PCT/SE2020/050893
§ 371 (c)(1),
(2) Date: Feb. 28, 2023

(87) PCT Pub. No.: WO2022/066073
PCT Pub. Date: Mar. 31, 2022

(65) Prior Publication Data
US 2023/0319597 A1      Oct. 5, 2023

(51) Int. Cl.
*H04W 24/02*      (2009.01)
*H04W 48/20*      (2009.01)

(52) U.S. Cl.
CPC ........... *H04W 24/02* (2013.01); *H04W 48/20* (2013.01)

(58) Field of Classification Search
CPC .............................. H04W 24/02; H04W 48/20
USPC ......................................................... 370/329
See application file for complete search history.

(56) References Cited

U.S. PATENT DOCUMENTS

| | | | |
|---|---|---|---|
| 12,120,774 B2 * | 10/2024 | Tomala | ................... G06N 20/00 |
| 2018/0338255 A1 * | 11/2018 | Fukuta | .................. H04W 24/08 |
| 2019/0166606 A1 * | 5/2019 | Kalderen | ............ H04W 72/542 |
| 2019/0394654 A1 * | 12/2019 | Gardner | ............... H04W 40/22 |
| 2020/0195506 A1 | 6/2020 | Peng et al. | |
| 2021/0345134 A1 * | 11/2021 | Ottersten | ............... G06N 3/006 |

(Continued)

FOREIGN PATENT DOCUMENTS

| | | | | |
|---|---|---|---|---|
| CN | 118215909 A | * | 6/2024 | ........... G06F 9/5044 |
| EP | 3435731 A1 | | 1/2019 | |

(Continued)

OTHER PUBLICATIONS

International Search Report and Written Opinion of the International Searching Authority, PCT/SE2020/050893, mailed Jun. 2, 2021, 13 pages.

*Primary Examiner* — Anthony Mejia
(74) *Attorney, Agent, or Firm* — Sage Patent Group

(57)      ABSTRACT

A method is herein provided, performed by a network node for handling configuration of radio network nodes in a wireless communication network. The network node such as a O&M node or similar calculates a configuration for one or more radio network nodes by using a machine learning model with a search space of parameters, wherein the search space is reduced based on an importance factor for parameters of the radio network nodes and/or the wireless communication network.

18 Claims, 11 Drawing Sheets

(56) References Cited

U.S. PATENT DOCUMENTS

| | | | | |
|---|---|---|---|---|
| 2023/0269606 A1 * | 8/2023 | Säily | .................... | H04W 24/02 |
| | | | | 455/67.11 |
| 2023/0276208 A1 * | 8/2023 | Ren | .................. | H04W 52/0251 |
| | | | | 370/329 |
| 2023/0297884 A1 * | 9/2023 | Karapantelakis | ...... | G06N 20/00 |
| | | | | 706/12 |
| 2023/0316135 A1 * | 10/2023 | Tout | ........................ | G06F 21/60 |
| | | | | 706/12 |
| 2024/0049003 A1 * | 2/2024 | Rydén | .................... | H04W 8/22 |

FOREIGN PATENT DOCUMENTS

| | | | | | |
|---|---|---|---|---|---|
| EP | 3826368 | A1 * | 5/2021 | ........ | H04W 52/0206 |
| WO | WO-0208458 | A1 * | 10/2002 | ......... | H04L 41/0893 |
| WO | WO-02080458 | A1 * | 10/2002 | ......... | H04L 41/0893 |
| WO | 2006097839 | A1 | 9/2006 | | |
| WO | 2013144950 | A1 | 10/2013 | | |
| WO | WO-2018068857 | A1 * | 4/2018 | ............ | H04W 24/08 |
| WO | WO-2021029797 | A1 * | 2/2021 | ............. | G06N 20/00 |
| WO | WO-2021040588 | A1 * | 3/2021 | ............. | G06N 20/00 |
| WO | WO-2024248883 | A1 * | 12/2024 | .......... | H04L 41/147 |

* cited by examiner

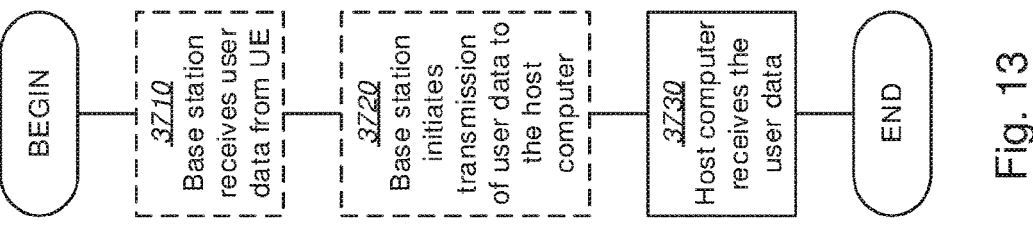

_3710_
Base station receives user data from UE

_3720_
Base station initiates transmission of user data to the host computer

_3730_
Host computer receives the user data

Fig. 13

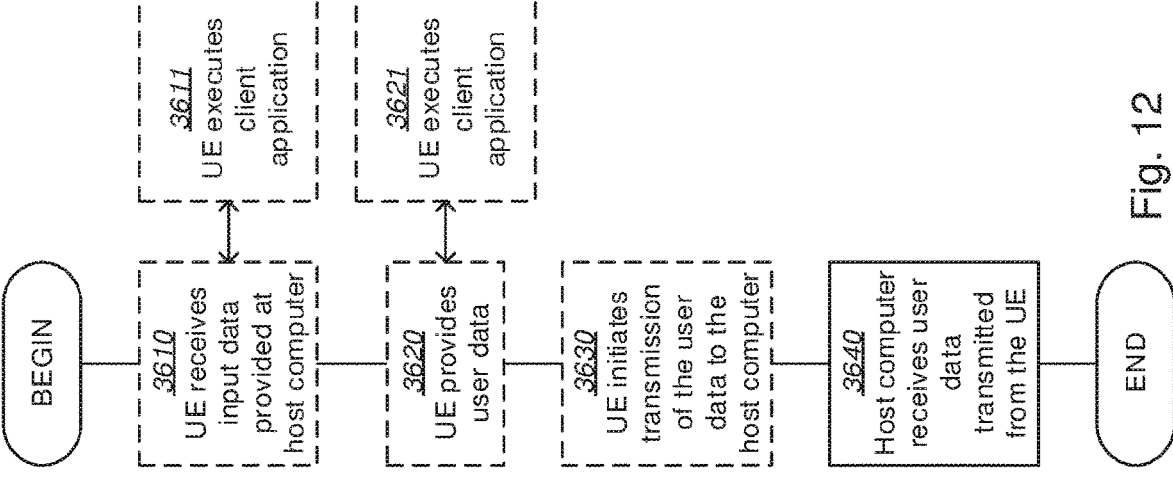

_3611_
UE executes client application

_3621_
UE executes client application

_3610_
UE receives input data provided at host computer

_3620_
UE provides user data

_3630_
UE initiates transmission of the user data to the host computer

_3640_
Host computer receives user data transmitted from the UE

Fig. 12

NETWORK NODE AND A METHOD PERFORMED IN A WIRELESS COMMUNICATION NETWORK FOR HANDLING CONFIGURATION OF RADIO NETWORK NODES USING REINFORCEMENT LEARNING

CROSS REFERENCE TO RELATED APPLICATIONS

This application is a 35 U.S.C. § 371 national stage application of PCT International Application No. PCT/SE2020/050893 filed on Sep. 23, 2020, the disclosure and content of which is incorporated by reference herein in its entirety.

TECHNICAL FIELD

Embodiments herein relate to a network node and a method performed therein regarding communication in a wireless communication network. Furthermore, a computer program product and a computer-readable storage medium are also provided herein. Especially, embodiments herein relate to handling or enabling communication in an energy efficient manner, e.g. handling configuration of radio network nodes, in the wireless communication network.

BACKGROUND

In a typical wireless communication network, UEs, also known as wireless communication devices, mobile stations, stations (STA) and/or wireless devices, communicate via a Radio Access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the UEs within range of the access node. The radio network node communicates over a downlink (DL) to the UE and the UE communicates over an uplink (UL) to the radio network node. The radio network node may be a distributed node comprising a remote radio unit and a separated baseband unit.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with UEs. In a forum known as the Third Generation Partnership Project (3GPP), telecommunications suppliers propose and agree upon standards for present and future generation networks, and investigate, amongst others, enhanced data rate and radio capacity. In some RANs, e.g. as in UMTS, several radio network nodes may be connected, e.g., by landlines or microwave, to a controller node, such as a radio network controller (RNC) or a base station controller (BSC) in 2G, which supervises and coordinates various activities of the plural radio network nodes connected thereto. The RNCs are typically connected to one or more core networks.

Specifications for the Evolved Packet System (EPS) have been completed within the 3GPP and work continues in the coming 3GPP releases regarding 5G and 6G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

5G is the fifth generation of cellular technology and was introduced in Release 15 of the 3GPP standard. It is designed to increase speed, reduce latency, and improve flexibility of wireless services. The 5G system (5GS) includes both a new radio access network (NG-RAN) and a new core network i.e. 5G core (5GC).

Similar to E-UTRAN in 4G, the NG-RAN uses a flat architecture and consists of base stations, e.g. gNBs and/or ng-eNBs, which may be interconnected with each other by means of the Xn-interface. The gNBs are also connected by means of the N2 and N3 interface to the 5GC, more specifically to the Access and Mobility Function (AMF) by the N2 interface and to the User Plane Function (UPF) by means of the N3 interface. The gNB in turn supports one or more cells which provides the radio access to the UE. The radio access technology, called New Radio (NR) is orthogonal frequency-division multiplexing (OFDM) based like in LTE and offers high data transfer speeds and low latency. Note that NR is sometimes used to refer to the whole 5G system although it is strictly speaking only the 5G radio access technology.

It is expected that NR will be rolled out gradually on top of the legacy LTE network starting in areas where high data traffic is expected. This means that NR coverage will be limited in the beginning and users must move between NR and LTE as they go in and out of coverage. To support fast mobility between NR and LTE and avoid change of core network, LTE eNBs may also connect to the 5G-CN and support the Xn interface. An eNB connected to 5GC is called a next generation eNB (ng-eNB) and is considered part of the NG-RAN.

Energy efficiency for radio network nodes of the future may heavily depend on how it is able to dynamically adjust the changes in traffic demand, which could be due to e.g. UEs' mobility factor. The change in traffic demand in turn may have some periodicity and cyclicality in it e.g. more traffic demands during the working hours as compared to evenings. As the UE's mobility patterns changes, it results in change of the following Number and frequency of Handovers (HO)

The throughput and latency demands

The required number of radio resource control (RRC) connections in an area

In a 5G scenario, this will get further complicated with different network slices and the respective quality of service (QoS) requirements/services being consumed by users. The network slices may be standardized ones like network slices for enhanced mobile broadband (eMBB), ultra-reliable low-latency communication (URLLC), massive machine type communications (mMTC) etc. or other non-standardized ones.

Consequently, the above dynamicity can be leveraged for energy savings by dynamically optimizing the following 1. Selection of specific radio network nodes which need to remain active within an area
2. Number of cells in a radio network node which needs to remain active
3. Transmission power of each cell, which transmission power may be adjusted to complement a neighbouring radio network node
4. Network slices/services, e.g. 5G services, which need to be provided at each radio network node (in sync with other neighbouring radio network nodes)
5. The tilt of the antennas of the radio network nodes
6. The state of a capacitor in each radio network node
7. Interference in the wireless communication network
8. Some more parameters which define the functions of the radio network nodes It would be reasonably logical to assume that there would be a few more such parameters so the total number would at least be close to 50 or more (considering both demand and supply side variables).

The above becomes more and more complex considering there may be hundreds or more radio network nodes in a city area and then each radio network node has many parameters which need to be dynamically modified with a changing traffic pattern.

SUMMARY

Currently there are hardly any solutions available which can look at energy optimization in totality in a wireless communication network, e.g. by synchronizing a certain cell tower/radio network node by leveraging other towers in vicinity. Any such solution or idea offered today is only with respect to a singular cell tower considering the load and demand on the same. However, the point to be noted is that any solution on a single radio network node is not optimal as it ignores the possibility of leveraging another cell tower in the vicinity.

Further, it is to be noted that if this is designed as an optimization problem, the feature space, i.e. set of all possible values for a chosen set of features, becomes so large that it is computationally very difficult to find the optimal configuration. So practically the algorithm training becomes almost impossible. Furthermore, since the optimality may change with mobility pattern, a certain solution derived with a specific mobility pattern may not be of much use for some other mobility pattern. Thus, frequent model training may be needed in an energy efficient manner.

An object of embodiments herein is to provide a mechanism that improves energy efficiency in the wireless communication network.

According to an aspect the object is achieved by providing a method performed by a network node, such as an gNB, operation and maintenance (O&M) node, AMF or Mobile Management Entity (MME), for handling configuration of radio network nodes in a wireless communication network. The network node calculates a configuration for radio network nodes using a machine learning (ML) model, such as a reinforcement learning model, with a search space of parameters, wherein the search space is reduced based on an importance factor for parameters of the radio network nodes and/or the wireless communication network.

It is furthermore provided herein a computer program product comprising instructions, which, when executed on at least one processor, cause the at least one processor to carry out any of the methods above, as performed by the network node. It is additionally provided herein a computer-readable storage medium, having stored thereon a computer program product comprising instructions which, when executed on at least one processor, cause the at least one processor to carry out the method according to any of the methods above, as performed by the network node.

According to another aspect the object is achieved by providing a network node, for handling configuration of radio network nodes in a wireless communication network. The network node is configured to calculate a configuration for radio network nodes using a machine learning (ML) model, such as a reinforcement learning model, with a search space of parameters, wherein the search space is reduced based on an importance factor for parameters of the radio network nodes and/or the wireless communication network.

Since the number of parameters to be considered in the wireless communication network are very large, subsequently the search space becomes very big. Embodiments herein use the application of the concept of an importance factor for parameters referred to herein as an interest and emphasis ratio, which reduces the search space to learn the environmental factors with the focus of energy optimization in the wireless communication network. Some embodiments herein may firstly reduce the search space by producing a similarity matrix of radio network nodes to make the search space smaller. After search space reduction is performed, a specific ML model is applied which may be chosen based on but not limited to mobility pattern during the day for a certain location.

Collaborative energy efficiency, including all radio network nodes, would far surpass individual optimization, i.e. only on one radio network node, and it includes both active and passive energy optimizations. Embodiments herein are very dynamic in nature and adjust based on the real-time traffic, and reduce the search space thus making the solution realistic and computationally efficient.

BRIEF DESCRIPTION OF THE DRAWINGS

Embodiments will now be described in more detail in relation to the enclosed drawings, in which:

FIG. 12 shows methods implemented in a communication system including a host computer, a base station and a user equipment in accordance with some embodiments; and FIG. 13 shows methods implemented in a communication system including a host computer, a base station and a user equipment in accordance with some embodiments.

DETAILED DESCRIPTION

Embodiments herein are described in the context of 5G/NR and LTE but the same concept can also be applied to other wireless communication system such as 4G/LTE and UMTS. Embodiments herein may be described within the context of 3GPP NR radio technology, e.g. using gNB as the radio network node. It is understood that the problems and solutions described herein are equally applicable to wireless access networks and user equipments (UEs) implementing other access technologies and standards. NR is used as an example technology where embodiments are suitable and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1:
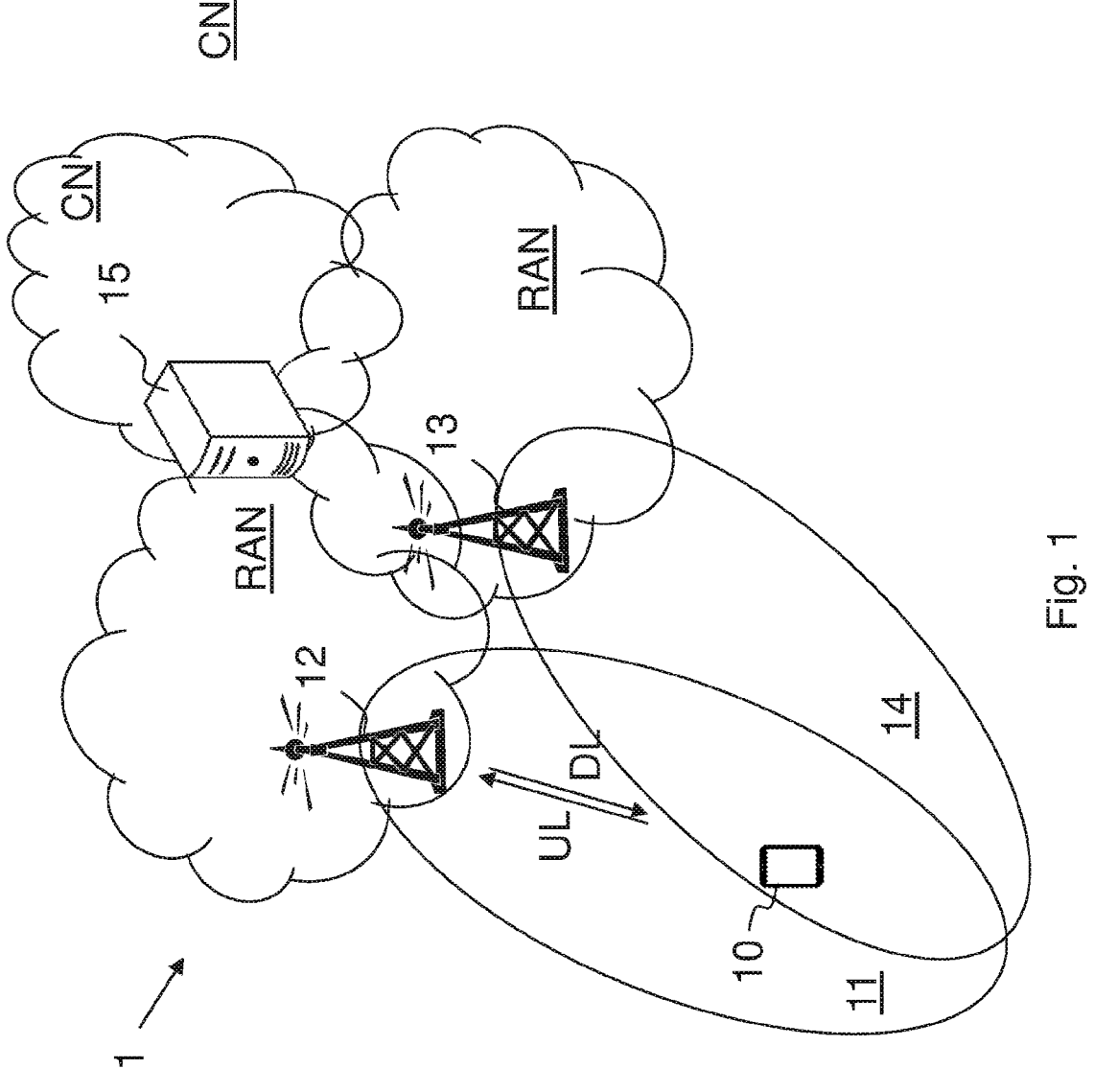
FIG. 1 shows a wireless communication network according to embodiments herein.

Embodiments herein relate to wireless communication networks in general. FIG. 1 is a schematic overview depicting a wireless communication network 1. The wireless communication network 1 comprises e.g. one or more RANs and one or more CNs. The wireless communication network 1 may use one or a number of different technologies, such as NR, Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

In the wireless communication network 1, wireless devices e.g. a UE 10 such as a mobile station, a non-access point (non-AP) station (STA), a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, internet of things (IoT) operable device, or node e.g. smart phone, laptop, mobile phone, sensor, relay, mobile tablets or even a small base station capable of communicating using radio communication with a radio network node within an area served by the network node.

The wireless communication network 1 comprises a first radio network node 12 of a first RAN providing e.g. radio coverage over a geographical area, a first service area 11 i.e. a first cell, of a first radio access technology (RAT), such as NR, LTE, Wi-Fi, WiMAX or similar. The first radio network node 12 may herein be referred to as the radio network node and may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB or eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The first radio network node 12 may be referred to as source access node or a serving network node wherein the first service area 11 may be referred to as a serving cell, source cell or primary cell, and the first radio network node 12 communicates with the UE 10 in form of DL transmissions to the UE 10 and UL transmissions from the UE 10. The first radio network node may be a distributed node comprising a baseband unit and one or more remote radio units.

The wireless communication network 1 comprises a second radio network node 13 on a second RAN providing e.g. radio coverage over a geographical area, a second service area 14 i.e. a second cell, of a second RAT, such as NR, LTE, Wi-Fi, WiMAX or similar. The second radio network node 13 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The second radio network node 13 may be referred to as a target access node or a target network node wherein the second service area 14 may be referred to as a target cell or secondary cell, and the second radio network node 13 communicates with the UE 10 in form of DL transmissions to the UE 10 and UL transmissions from the UE 10. The second radio network node may be a distributed node comprising a baseband unit and one or more remote radio units. The second RAT may be the same or different than the first RAT.

It should be noted that a service area may be denoted as cell, beam, beam group or similar to define an area of radio coverage.

The wireless communication network may further comprise a network node 15, e.g. a AMF, MME, an operation and maintenance (O&M) node, or a network node handling configuration of radio network nodes such as the first and the second radio network nodes in the wireless communication network.

Embodiments herein relate to a method and the network node 15 for providing configuration or configurations for multiple radio network nodes in the wireless communication network. In order to calculate an optimal configuration across the radio network nodes in an area dependent on e.g. changing mobility patterns, a machine learning problem may be defined.

Since the number of parameters to be considered are very large, subsequently the search space, i.e. set of all possible values for a set of features, becomes very big. This idea proposes to reduce the search space in order to make the search space smaller by applying the concept of importance factor for parameters, also referred to as interest and emphasis ratio, to learn the environmental factors and dynamically adjusting the environment accordingly with the focus of energy optimization using a machine learning (ML) model. Embodiments herein propose collaborative energy optimization on cluster of radio network nodes, e.g. generating a similarity matrix that includes a radio network node and its neighboring radio network nodes, and dynamically adjusting/optimizing the traffic demands for efficient energy usage. This is achieved by efficiently calculating an optimal configuration across multiple radio network nodes using the ML model with the reduced search space. The ML model may be a reinforcement learning (RL) model.

It should be noted that mobility patterns may change throughout the day. In the morning services are provided for office workers, then sales professionals, then school hours and then office workers returning home and then leisure travelers. So overall each mobility pattern represents a specific distribution of parameters and values and for each distribution a specific RL model may be trained. Frequent model training on changing mobility patterns may be enabled and improvement in accuracy of the Q value for the interested states, thus, resulting in an energy efficient solution in the wireless communication network. A lifecycle management (LCM) process may track the distribution and based on incoming distribution for last instances, e.g. 15 minutes, an appropriate RL model may be selected based on the mobility pattern.

Embodiments herein may provide one or more of the following:

collaborative, including all radio network nodes, energy efficiency that would far surpass individual optimization, wherein only one radio network node is considered.

it includes both active and passive energy optimizations. Passive component: e.g. a power supply unit (PSU) can have a passive control, inside the PSU Firmware. It controls its own operation, as a unit. No control from top layer as a controller. Active component: e.g. a base band and radio, interacting with each other, exchanging information, to enable active energy management control, between units. In such cases, when communication is broken between base band and radio, the radio enters passive control (of a radio unit). Usually this happen when faults occur. Active components are those which deliver or produce energy or power in the form of a voltage or current. Passive components are those which utilises or store energy in the form of voltage or current. Active components are energy donor, whereas the passive components are energy acceptor. From wireless communication network perspective: active components are radio network nodes, radio/BB as they provide energy to UE. Passive are PSU, battery, cables, diesel generators. For a power system without radio system: active components are PSUs, wherein a transformer and battery are used as backup are passive. An uninterruptible power supply (UPS) may be passive and active.

it includes a dynamic solution in nature and adjusts configuration based on the real-time traffic.

the search space is reduced, thus making the solution realistic and computationally efficient.

it may enable frequent RL model training on changing mobility patterns it may improve in accuracy of the Q value for the interested states. Here interested states refer to those states which has optimal energy consumption according to the prevailing mobility pattern. Often in normal RL techniques, convergence to optimal values takes a lot of iteration and happens only in limit. The emphasis ratio shortens the length of iterations. The use of interest ratio reduces the number of states and makes the convergence closer to the true value than it would have been otherwise.

Figure 2:
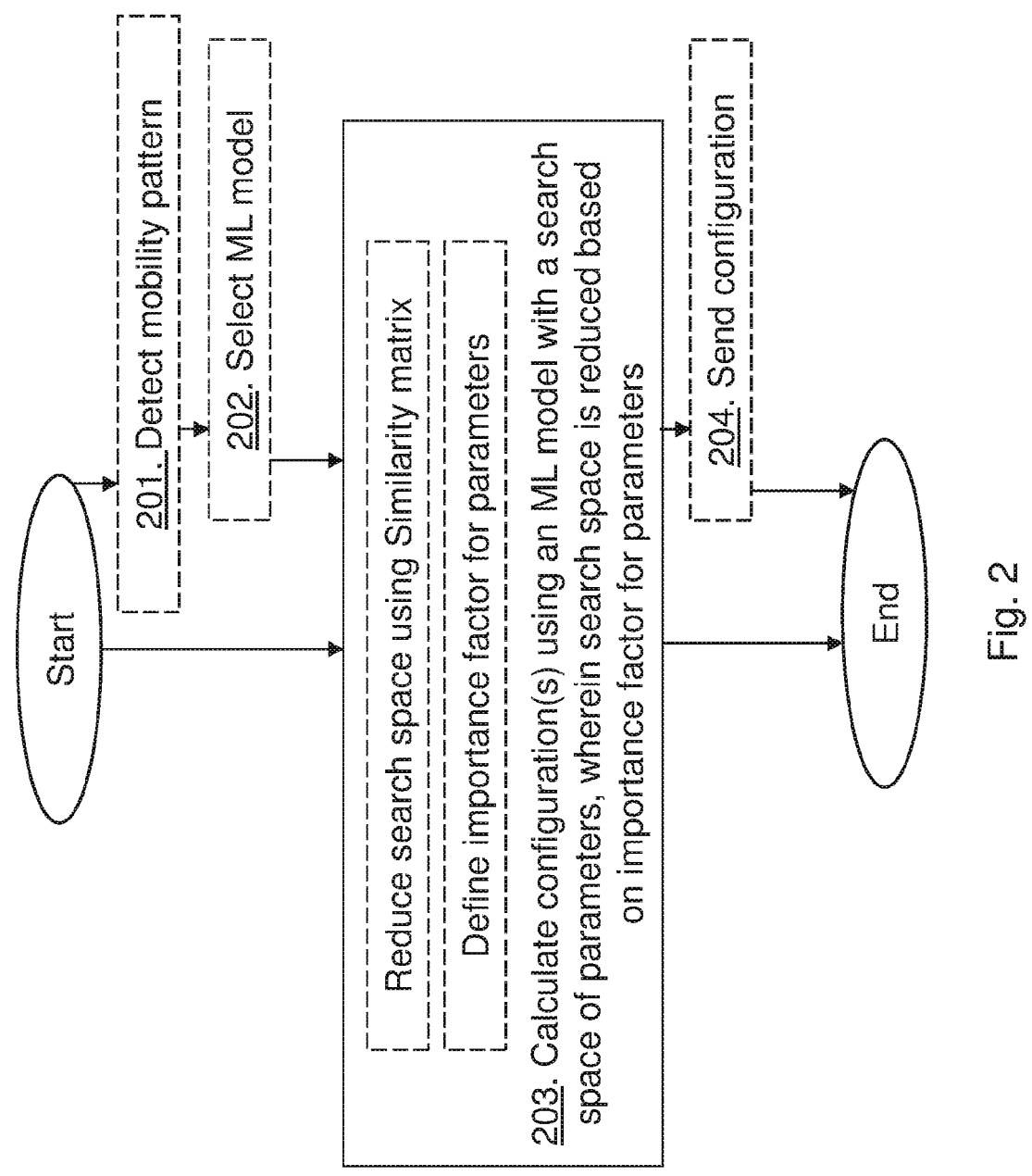
FIG. 2 shows a flowchart depicting a method performed by a network node according to embodiments herein.

The method actions performed by the network node 15 such as a gNB, an AMF, an MME, an O&M node, or similar for handling configuration of radio network nodes in the wireless communication network according to embodiments will now be described with reference to a flowchart depicted in FIG. 2. The actions do not have to be taken in the order stated below, but may be taken in any suitable order. Optional actions are marked with dashed boxes.

Action 201. The network node 15 may detect a mobility pattern in the wireless communication network e.g. based on handovers (HO), amount of traffic etc.

Action 202. The network node 15 may then select the ML model used in calculating the configuration based on the detected mobility pattern. The network node 15 may comprise a number of ML models for e.g. different mobility patterns or other parameters or scenarios.

Action 203. The network node 15 calculates a configuration for radio network nodes using the ML model, such as a RL model, with a search space of parameters, wherein the search space is reduced based on an importance factor for parameters of the radio network nodes and/or the wireless communication network. The network node may thus use the selected ML model based on the mobility pattern detected. The importance factor may be defined as a ratio defining an interest and emphasis of a parameter. So based on a specific value of a parameter, e.g. a state of high transmission power in a cell which may induce interference with neighbouring cells, we may define minimal interest in a certain state and then the state will not be given importance during the action—value computation as opposed to an important state. The interest and emphasis may be for a plurality of radio network nodes and based on a business intent, e.g. derived from a business intent such as a certain throughput or a latency requirement. The search space may further be reduced, before reducing the search space using the importance factor for parameters, by, e.g. using a similarity matrix by clustering radio network nodes of similar parameters. The ML model may be using the output from a similarity matrix and the output of the reduction based on the importance factor for parameters. E.g. we herein define importance factor for parameters after the similarity matrix process is completed, but the effect of search space reduction by the importance factor will happen when e.g. the interest and emphasis ratios are fed into the RL algorithm. The similarity matrix may be generated by hierarchical clustering of similar sites of radio network nodes, wherein the clustering is based on similarity of load and resource factors. Thus, the similar radio network nodes in the hierarchical cluster may be represented by a single radio network node and thereby the total number of radio network nodes may be reduced before it is fed to ML model. This is given the assumption that very similar radio network nodes in a hierarchical cluster should have similar behavioural patterns and an optimal configuration may be close enough to be approximated by a single radio network node in e.g. an RL algorithm. The input to the ML model may be a combination of network and demand parameters for all radio network nodes selected in the wireless communication network and reduced based on the importance factor for parameters. The output of the ML model may be a set of parameter values for each radio network node attaining a state of low energy consumption while maximizing demand requirements, e.g. energy consumption lower than a threshold while having a quality of experience (QoE) above a set threshold. The selected radio network nodes may be based on the similarity matrix. The output of ML model may be weighted based on an average of all QoEs, which can be predicted from network parameters and a penalty factor for each unit of added energy consumption. The ML model may be an RL model. The output from the ML model may be a recommendation action which can be actuated on the wireless communication network such as a set of actions for each radio network node detailing the configurations like tilt, power etc. The reward parameter from the ML model may be cumulative or averaged QoE across all radio network nodes.

Action 204. The network node 15 may then send the calculated configuration to the radio network nodes.

Figure 3:
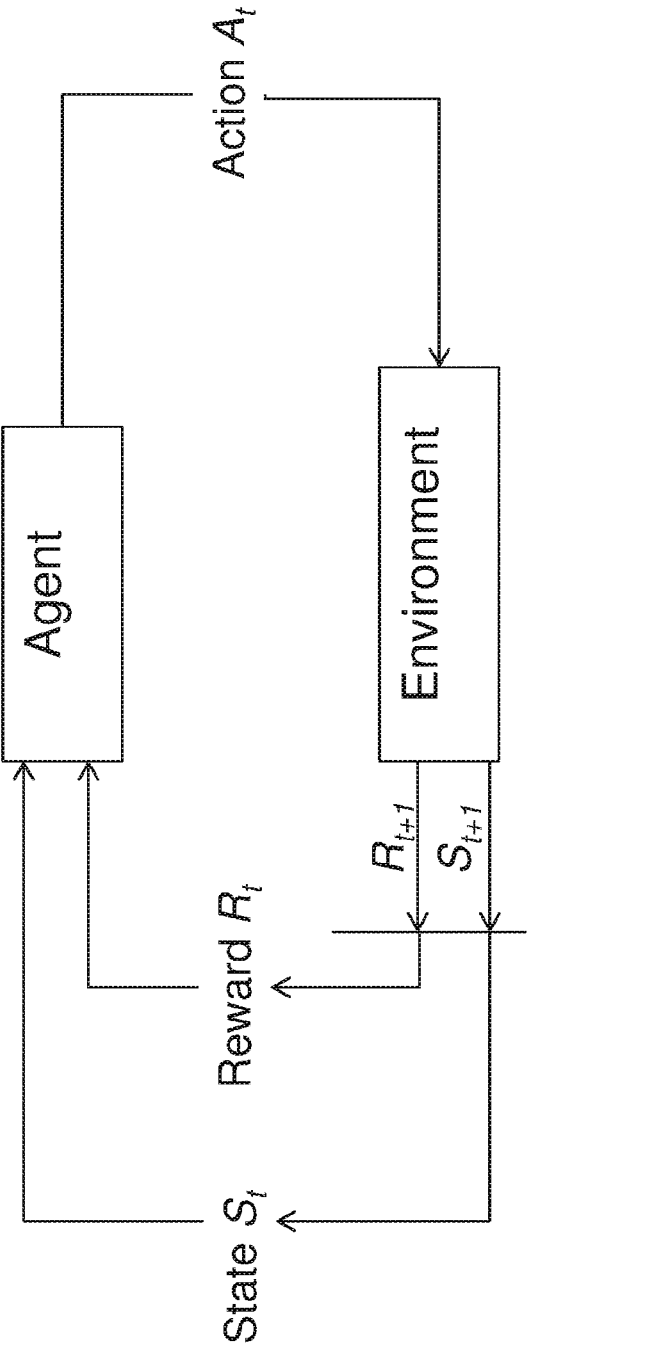
FIG. 3 shows an RL framework for to calculate an optimal configuration across multiple radio network nodes.

According to embodiments herein a ML model such as a closed feedback RL loop framework is herein provided and is shown in FIG. 3.

The environment may be defined as the selected region of e.g. a city which has a few hundred radio network nodes. The region may be defined in a way such that the mobility patterns can change within the region but for most cases the traffic originates and ends within the region of interest. The similarity matrix i.e. defining the regions e.g. local zones around radio network nodes may lead towards hierarchical clustering of radio network nodes into small groups based on similarity of load and resource factors.

For each mobility pattern, a state is defined as the combination of network and demand parameters defined in earlier section for all radio network nodes. Now if each radio network node has about 50 features, with even three basic values of High/Medium/Low for each feature, with total few hundred radio network nodes the feature space becomes too large and even the action space becomes larger.

The output, i.e. the reward, may be computed based on a weighted average of all QoEs which can be predicted from network parameters. A negative reward may be given for each unit of energy consumption in a radio network node. So, if active radio network nodes may be reduced or number or services or transmission power can be reduced the overall negative reward can be optimized or minimized.

Embodiments herein may use the similarity matrix clustering radio network nodes thereby reducing the search space. In order to ensure an efficient compute for optimality similar radio network nodes are firstly found. The similarity may be found based on a DBScan, which is a density based clustering method, or a tree-based Chameleon Hierarchical clustering technique which can cluster radio network nodes into small groups based on similarity of load and resource factors e.g. number of UEs serviced, Distribution of 5G of services active in the node, Transmission power and area serviced, Tilt configurations used in past, Node capacity utilization.

Once the clusters of radio network nodes have been found out, i.e. once the similarity matrix is generated, then for each cluster the "most important" radio network node may be determined. The suggested approach may be to take e.g. the radio network node with the most serviced users. It should be noted that the radio network nodes in the cluster need not be in close proximity to each other. They may be similar radio network nodes with regard to load and performance characteristics.

Then extending the similarity obtained, embodiments herein use the concept of importance factor for parameters also referred to herein as Interest and Emphasis ratio. A variable $I_t$ called Interest may herein be introduced, which variable denotes how interested a radio network node is. An Interest value of 1 shows maximum interest while the interest value of zero shows no interest in that state of radio network node. The Interest values could be set according to business intent or business rules which could be derived from Intents such as set throughput or similar. Example, if the latency values need to be lower than a threshold, then any state having a higher latency value can be set as a state of Zero interest—meaning the algorithm will not be interested in computing values of all those states.

Similarly, a more complex rule may be e.g.: certain locations like Central Business Districts which are expected to have high-rises, should operate in a QoE—which could translate to having some selected frequency bands only and should have a minimum of certain throughput. So, any states in the location not having the above configurations are by default classified as not of Interest.

Let us assume a total number of radio network nodes before clustering is N.

After clustering and identification of "most important" radio network nodes in a cluster the number is P, i.e. after similarity matrix.

Given P is expected to be a considerably less than N the total parametrization space (i.e. the search space) drops by few folds but still may not be enough for efficient computation. The concept of importance i.e. Interest and Emphasis, will now be described.

The above concept of interest may also be applied to states not of much interest. Say for example we want to know if some actions result in particularly poor QoE for some of the states, like if you tune certain parameters it results in increased interference. Or a. we may NOT want to power off few cells knowing they serve an important area. So, the cell states having the parameters of power-off could have low Interest and consequently lower Emphasis Ratio b. we may not be interested in certain tilt angles given they may not provide reasonable rewards.

c. we may not be interested in condition where Transmission power is above a threshold knowing it causes interference.

d. Finally, we may be interested only in a limited number of time steps to solve the problem in order to reduce frequent changes in network configuration during learning . . . . So once the episodic steps exceed a certain number of threshold time steps we ignore them by reducing the Emphasis value.

In order to achieve the above, we use the Emphasis ratio

This Emphasis ratio multiplies the learning update and thus emphasizes or de-emphasizes the learning done at time t.

$$w_{t+n} := w_{t+n-1} + \alpha M_t [G_{t:t+n} - \hat{v}(S_t, w_{t+n-1})] \nabla \hat{v}(S_t, w_{t+n-1}), \quad 0 \le t < T,$$

the emphasis is determined recursively from the interest by: $Mt = I_t + \gamma^n M_{t-n}$, $0 \le t < T$, (9.25) with $M_t := 0$, for all t<0. W is the parameter vector at time t, a is the learning rate, $M_t$ is the emphasis ratio calculated from Interest ratio, V is the value of the state action pair, and $\nabla v$ is the gradient.

Figure 4:
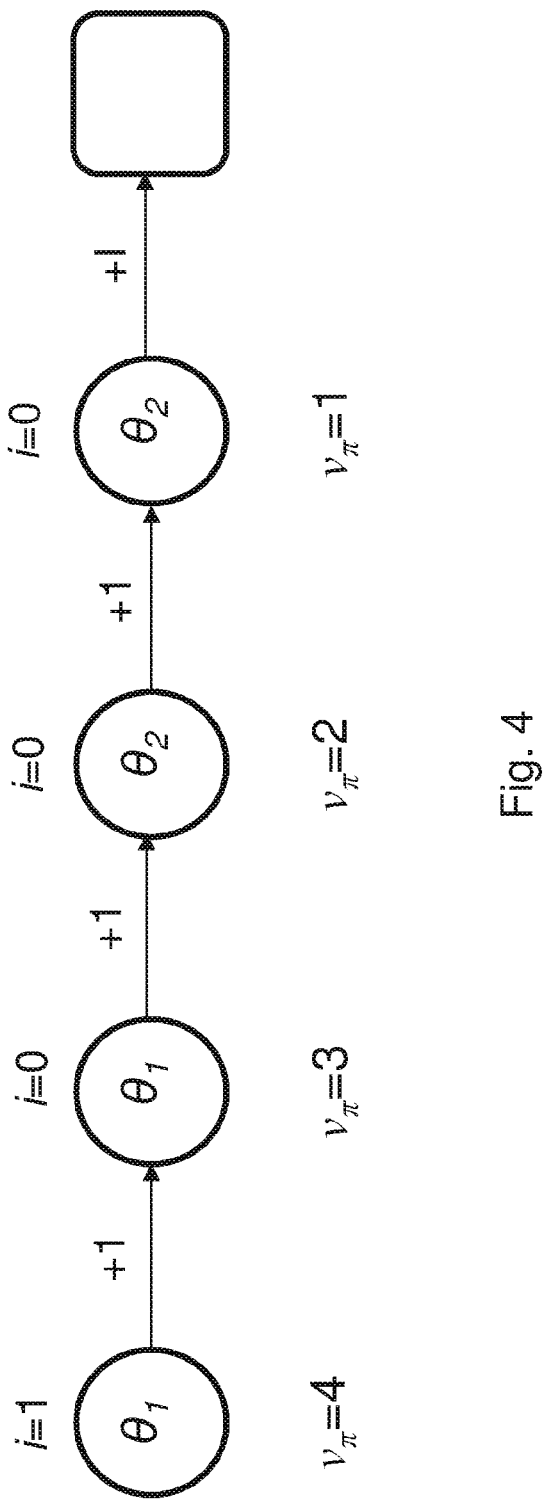
FIG. 4 shows a schematic four state Markov reward process.

To see the potential of using interest and emphasis the four state markov reward process is considered and shown in FIG. 4.

Episodes start in the leftmost state, then transition one state to the right with a reward of +1, on each step until terminal state is reached. The true value of the first state is thus 4, of the second state 3, and so on as shown below each state. These are the true values, the estimated values can only approximate these because they are constrained by the parameterization. There are two components to the parameter vector $w=(w_1, w_2)^T$, and the parameterization is as written inside each state. The estimated values of the first two states are given by $w_1$ alone and thus may be the same even though their true values are different. Similarly, the estimated values of the third and fourth states are given by $w_2$ alone and may be the same even though their true values are different. Suppose that we are interested in accurately valuing only the leftmost state, we assign it an interest of 1 while all the other states are assigned an interest of 0 as indicated above the states.

Using classical Monte Carlo (MC) method $\theta_1$ and $\theta_2$ will converge to 3.5 and 1.5 at infinity. However, using Emphasis and Interest Ratio $\theta_1$ and $\theta_2$ will converge to 4 and null (2) respective for MC and Temporal difference (TD) methods.

So effectively states which meet the conditions stated in (see a to d above) are marked with Interest value of Zero. That means they are skipped for the RL model such as Deep Q Learning (DQN) computation and thereby the overall optimality is achieved faster.

The other part is the accuracy. It is a known that when the state space is huge even parameterized DQNs do not yield a high accuracy in all states. So if we are able to provide an interest value on specific states then the approximated output value e.g. Q-value such as $Q^{\hat{}}(s,a)$ would be much closer to actual value, $Q\pi(s,a)$. Interest value of 0 or number close to zero enables the computations to skip that state during iterations. Hence the length of episodes decreases. This results in faster convergence to the true value with minimum number of episodes. $Q\pi$ is the true value of the state, $Q^{\hat{}}$ is the approximated value by the function. So, this not only helps in faster convergence but also in better approximations of the Q function for the interested states only.

Figure 5:
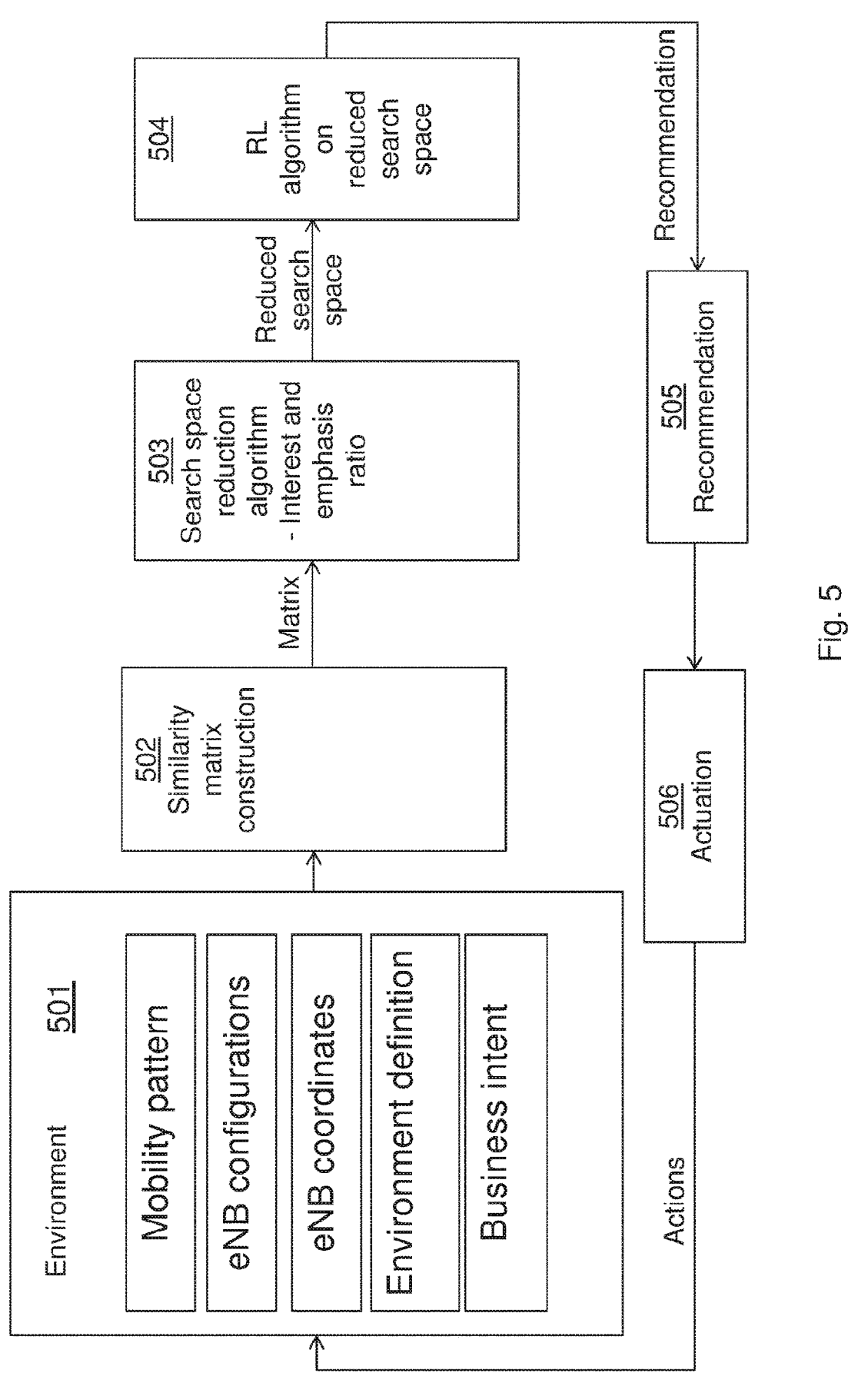
FIG. 5 shows a block diagram depicting a solution according to some embodiments herein.

The components in some embodiments herein are shown in FIG. 5, based on the RL model and using hierarchical clustering, and may reside in the cloud or edge. It would be better to process most of the data at the edge which is related to radio network nodes and then send either the similarity matrix and/or if possible only reduced search (state) space to the RL algorithm to execute in the cloud. FIG. 5 illustrates an architecture wherein environment, see action 501, comprises mobility patterns, eNB configurations, eNB coordinates, environment definition, business intents. Environment presents the telco domain environment from where the collected data is provided as input and the actions actuated upon. The data from the environment is used in the similarity matrix construction, see action 502, and the similarity matrix is fed into the search space reduction algorithm, see action 503, wherein a search space decider logic and interest and emphasis ratio are used to reduce the search space i.e. state space. The data of the reduce search space is used in the ML model e.g. selected based on mobility patterns e.g. applying an RL algorithm on reduced search space, see action 504. From the ML model an output is generated and executed for actuation, which output is the output actions recommended, see action 505, by the ML model to optimise the energy and actuations, see action 506, to perform by e.g. a baseband unit.

Figure 6:
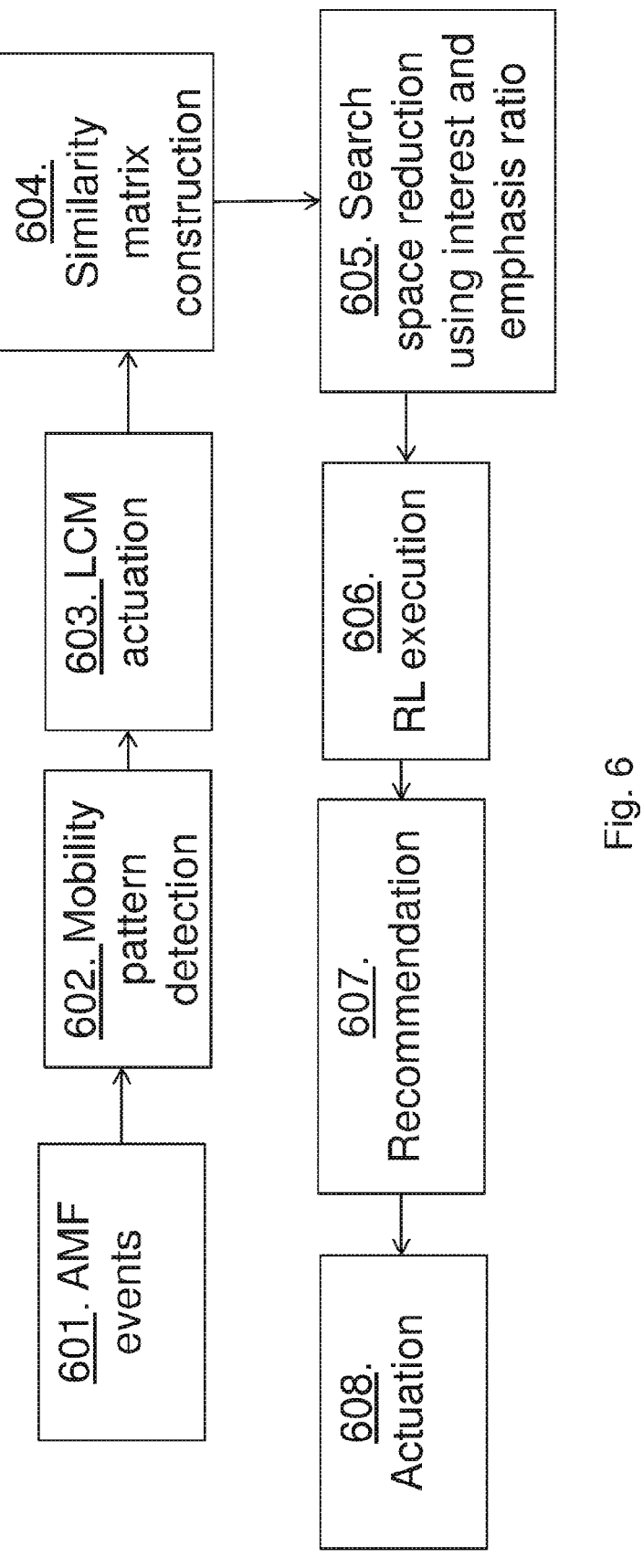
FIG. 6 shows a flowchart depicting runtime setup according to some embodiments herein.

During run-time, based on the type of mobility pattern the relevant instance of the ML model being an RL model could be instantiated as described in FIG. 6. AMF events occur, see action 601, such as handovers or similar, The mobility pattern prevailing in the radio network nodes is detected, see action 602, and if there is a change in the mobility pattern the model life cycle management and actuation process is started, see action 603. Firstly, the similarity matrix is constructed, see action 604, based on any of the clustering techniques mentioned and the search space is reduced to some extent before the data is fed to the algorithm. Post the same, a second round of state-space reduction is carried out by Setting the interest and Emphasis ratio, see action 605, for each state in the search space already reduced in the similarity matrix. This can be fully automated according to the business logic fed to the system. Once the search space is further reduced, using the above Interest and Emphasis ratio, see action 605, the RL algorithm, for the particular mobility pattern is executed, see action 606, by the LCM. The output of the RL model contains a list of optimized parameters for each node e.g. recommendations, see action 607, i.e. what should be the tilt, power, throughput for each node. The suggestions are effected in all radio network nodes and for similar radio network nodes i.e. actuated 608, the same state-action value is replicated.

Figure 7:
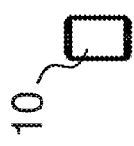
FIG. 7 shows a network node according to embodiments herein.
Figure 7:
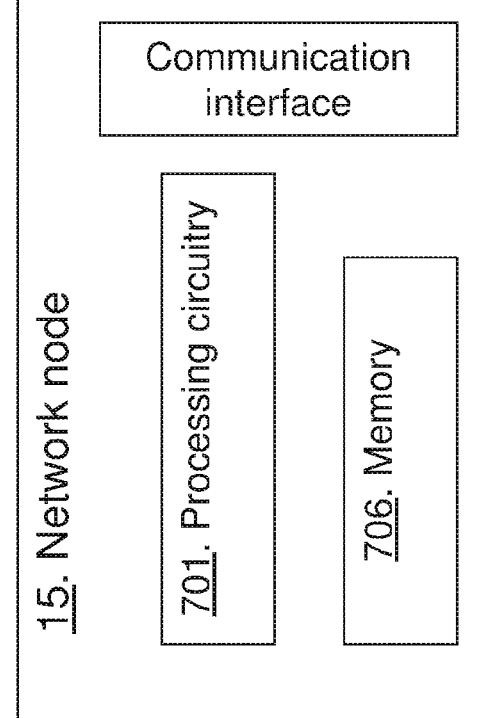
Figure 7:
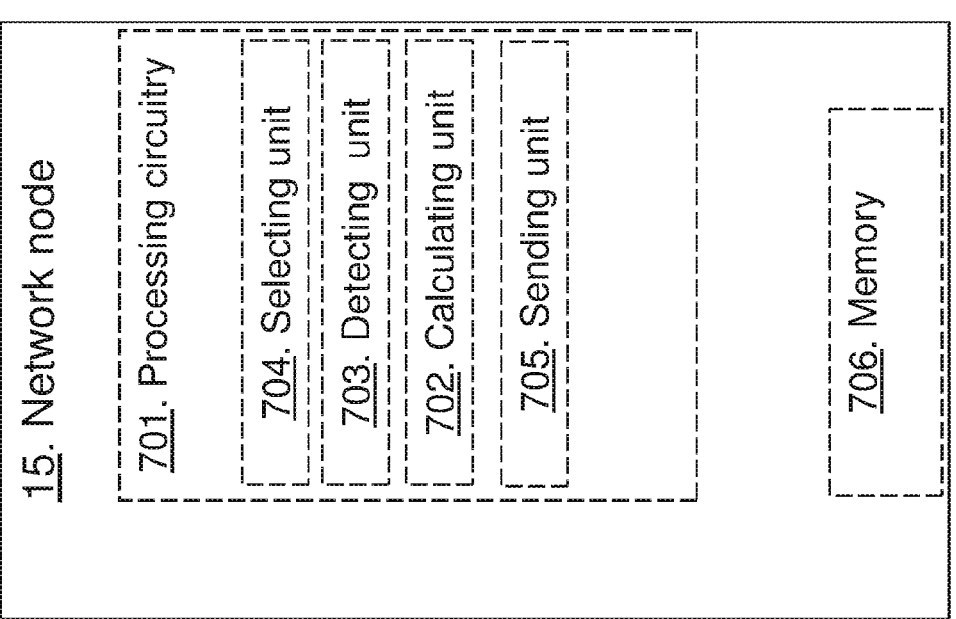
Figure 7:
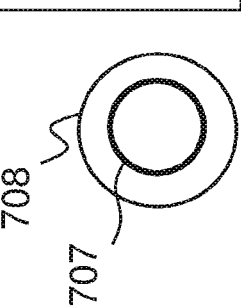

FIG. 7 is a block diagram depicting the network node 15, in two embodiments, for handling or managing configuration(s) of the radio network nodes in the wireless communication network 1 according to embodiments herein.

The network node 15 may comprise processing circuitry 701, e.g. one or more processors, configured to perform the methods herein.

The network node 15 may comprise a calculating unit 702. The network node 15, the processing circuitry 701, and/or the calculating unit 702 is configured to calculate the configuration for radio network nodes using the ML model with the search space of parameters. The search space is reduced based on the importance factor for parameters of the radio network nodes and/or the wireless communication network. The importance factor may be defined as the ratio defining an interest and emphasis of a parameter. The interest and emphasis may be for a plurality of radio network nodes and based on a business intent. The search space may further be reduced, e.g. before reducing the search space using the importance factor for parameters, by using the similarity matrix for clustering radio network nodes of similar parameters. The ML model may be using the output of similarity matrix and the output of the reduction based on the importance factor for parameters. The similarity matrix may be generated by hierarchical clustering of similar sites of radio network nodes, wherein the clustering may be based on similarity of load and resource factors. The input to the ML model may be a combination of network and demand parameters for radio network nodes selected in the wireless communication network, and the output of the ML model may be a set of parameter values for each radio network node attaining a state of low energy consumption while maximizing demand requirements. The selected radio network nodes may be based on the similarity matrix. The output of the ML model may be weighted based on an average of all QoEs which can be predicted from network parameters and a penalty factor for each unit of added energy consumption.

The network node 15 may comprise a detecting unit 703. The network node 15, the processing circuitry 701, and/or the detecting unit 703 may be configured to detect the mobility pattern in the wireless communication network.

The network node 15 may comprise a selecting unit 704. The network node 15, the processing circuitry 701, and/or the selecting unit 704 may be configured to select the ML model used in calculating the configuration based on the detected mobility pattern.

The network node 15 may comprise a sending unit 705, e.g. a transmitter or a transceiver. The network node 15, the processing circuitry 701, and/or the sending unit 705 may be configured to send the calculated configuration to the radio network nodes.

The network node 15 further comprises a memory 706. The memory comprises one or more units to be used to store data on, such as ML models, parameters, radio network node information, indications, strengths or qualities, grants, messages, execution conditions, user data, reconfiguration, configurations, scheduling information, timers, applications to perform the methods disclosed herein when being executed, and/or similar. Thus, the network node may comprise the processing circuitry and the memory, said memory comprising instructions executable by said processing circuitry whereby said network node is operative to perform the methods herein. The network node comprises a communication interface comprising e.g. transmitter, receiver, transceiver and/or one or more antennas.

The methods according to the embodiments described herein for the network node are respectively implemented by means of e.g. a computer program product 707 or a computer program product, comprising instructions, i.e., software code portions, which, when executed on at least one processor, cause the at least one processor to carry out the actions described herein, as performed by the network node 15. The computer program product 707 may be stored on a computer-readable storage medium 708, e.g. a universal serial bus (USB) stick, a disc or similar. The computer-readable storage medium 708, having stored thereon the computer program product, may comprise the instructions which, when executed on at least one processor, cause the at least one processor to carry out the actions described herein, as performed by the network node 15. In some embodiments, the computer-readable storage medium may be a non-transitory or transitory computer-readable storage medium.

In some embodiments a more general term "network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), gateways, transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However, embodiments are applicable to any RAT or multi-RAT systems, where the UE receives and/or transmit signals (e.g. data) e.g. NR frequency division duplex (FDD)/time division duplex (TDD), LTE FDD/TDD, Wi-Fi, WLAN, etc.

As will be readily understood by those familiar with communications design, that function means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 8:
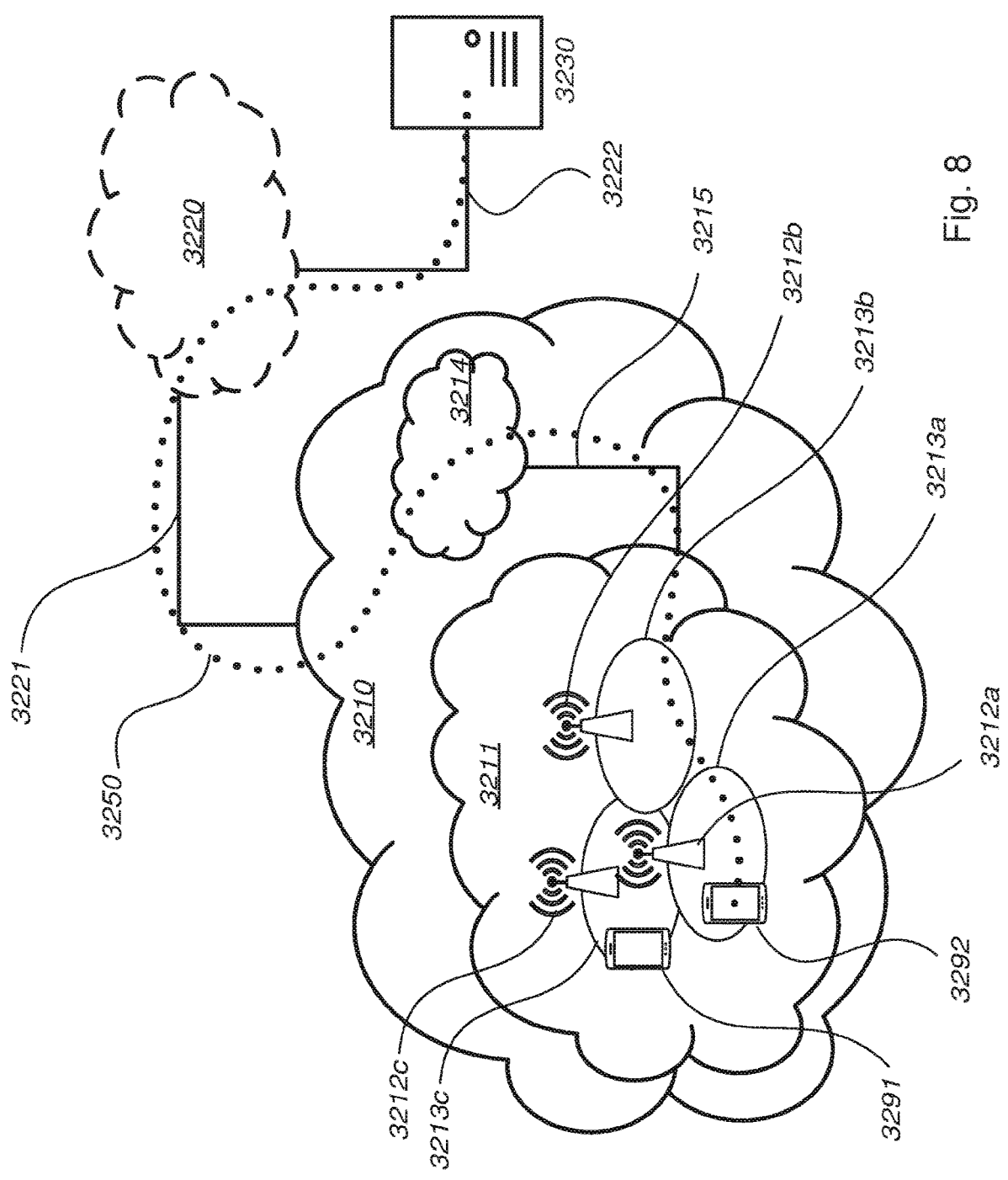
FIG. 8 shows a telecommunication network connected via an intermediate network to a host computer in accordance with some embodiments.

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
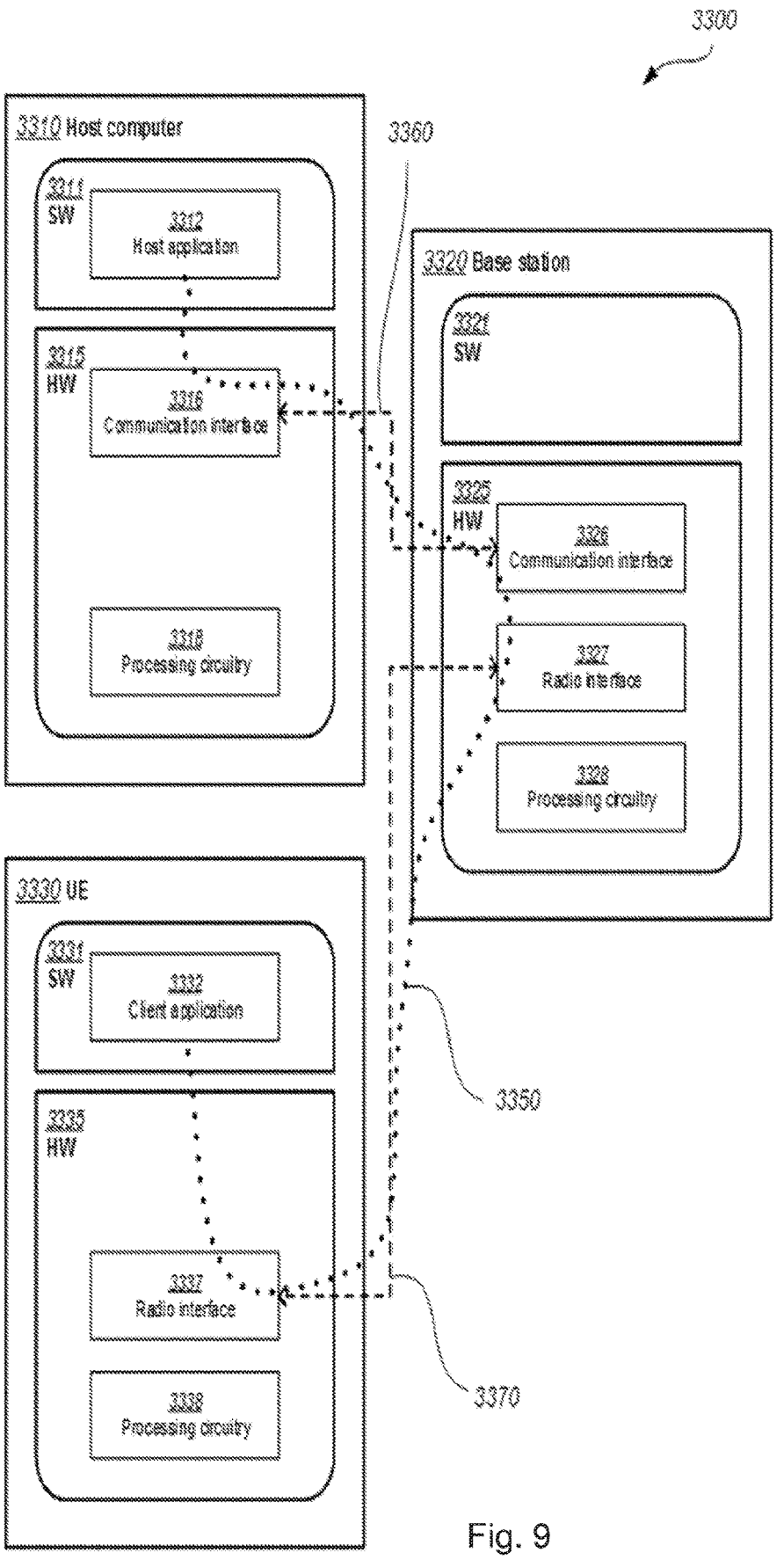
FIG. 9 shows a host computer communicating via a base station with a user equipment over a partially wireless connection in accordance with some embodiments.

It is noted that the host computer 3310, base station 3320 and UE 3330 illustrated in FIG. 9 may be identical to the host computer 3230, one of the base stations 3212*a*, 3212*b*, 3212*c* and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may handle configurations in an energy efficient manner and thereby provide benefits such as improved better responsiveness and prolonged battery life.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 10:
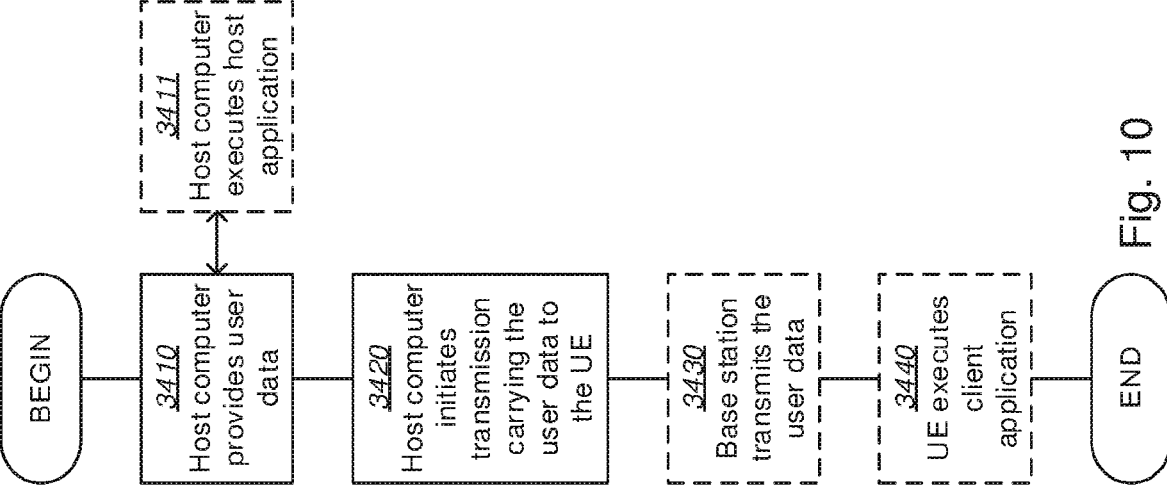
FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 11:
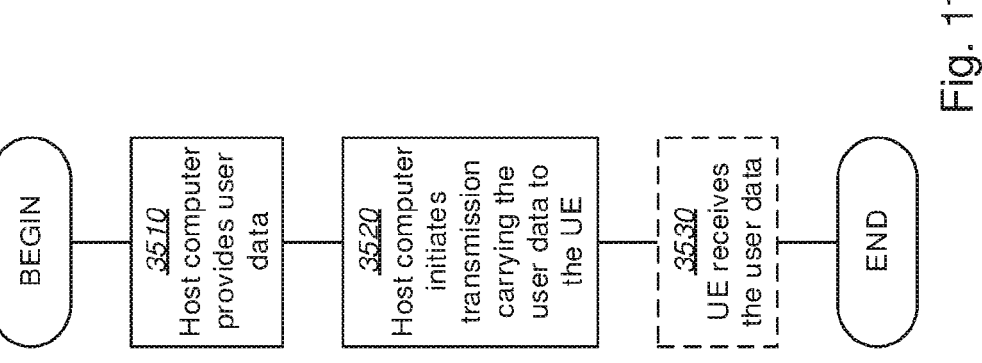
FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

| Abbreviation | Explanation |
|---|---|
| 3GPP | 3rd Generation Partnership Project |
| 5G | 5th Generation |
| 5GS | 5G System |
| 5GC | 5G Core network |
| CHO | Conditional Handover |
| CR | Change Request |
| DAPS | Dual Active Protocol Stack |
| DRB | Data Radio Bearer |
| E-UTRAN | Evolved Universal Terrestrial Access Network |
| gNB | 5G Node B |
| HO | Handover |
| LTE | Long-term Evolution |
| NG | The interface/reference point between the RAN and the CN in 5G/NR. |
| NG-C | The control plane part of NG (between a gNB and an AMF). |
| NG-U | The user plane part of NG (between a gNB and a UPF). |
| NG-RAN | Next Generation Radio Access Network |
| NR | New Radio |
| PDCP | Packet Data Convergence Protocol |
| PDU | Protocol Data Unit |
| RAN | Radio Access Network |
| RB | Radio Bearer |
| RLC | Radio Link Control |
| ROHC | Robust Header Compression |
| RRC | Radio Resource Control |
| SDU | Service Data Unit |
| SGW | Serving Gateway |
| SN | Sequence Number |
| TS | Technical Specification |
| UE | User Equipment |
| UL | Uplink |
| UPF | User Plane Function |

-continued

| Abbreviation | Explanation |
|---|---|
| Xn | The interface/reference point between two gNBs |

The invention claimed is:

1. A method performed by a network node for handling configuration of radio network nodes in a wireless communication network, the method comprising:

calculating a configuration for radio network nodes using a machine learning (ML) model with a search space of parameters, wherein the search space is reduced based on an importance factor for parameters of the radio network nodes and/or the wireless communication network, wherein the importance factor is defined as a ratio defining an interest and emphasis of a parameter.

2. The method according to claim 1, wherein the interest and emphasis is for a plurality of radio network nodes and based on a business intent.

3. The method according to claim 1, wherein the search space is further reduced, before reducing the search space using the importance factor for parameters, by using a similarity matrix for clustering radio network nodes of similar parameters.

4. The method according to claim 3, wherein the ML model is using the output of similarity matrix and the output of the reduction based on the importance factor for parameters.

5. The method according to claim 3, wherein the similarity matrix is generated by hierarchical clustering of similar sites of radio network nodes, wherein the clustering is based on similarity of load and resource factors.

6. The method according to claim 1, wherein input to the ML model is a combination of network and demand parameters for radio network nodes selected in the wireless communication network, and wherein output of the ML model is a set of parameter values for each radio network node attaining a state of low energy consumption while maximizing demand requirements.

7. The method according to claim 6, wherein the selected radio network nodes are based on a similarity matrix for clustering radio network nodes of similar parameters.

8. The method according to claim 1, wherein an output of the ML model is weighted based on an average of all quality of experiences (QoE) which can be predicted from network parameters and a penalty factor for each unit of added energy consumption.

9. The method according to claim 1, further comprising detecting a mobility pattern in the wireless communication network; and wherein the ML model used in calculating the configuration is selected based on the detected mobility pattern.

10. The method according to claim 1, further comprising sending the calculated configuration to the radio network nodes.

11. A network node for handling configuration of radio network nodes in a wireless communication network, the network node comprising:

processing circuitry; and memory coupled with the processing circuitry, wherein the memory includes instructions that when executed by the processing circuitry causes the network node to perform operations comprising:

calculate a configuration for radio network nodes using a machine learning (ML) model with a search space of parameters, wherein the search space is reduced based on an importance factor for parameters of the radio network nodes and/or the wireless communication network, wherein the importance factor is defined as a ratio defining an interest and emphasis of a parameter.

12. The network node according to claim 11, wherein the interest and emphasis is for a plurality of radio network nodes and based on a business intent.

13. The network node according to claim 11, wherein the search space is further reduced, before reducing the search space using the importance factor for parameters, by using a similarity matrix for clustering radio network nodes of similar parameters.

14. The network node according to claim 13, wherein the ML model is using the output of the similarity matrix and the output of the reduction based on the importance factor for parameters.

15. The network node according to claim 13, wherein the similarity matrix is generated by hierarchical clustering of similar sites of radio network nodes, wherein the clustering is based on similarity of load and resource factors.

16. The network node according to claim 11, wherein input to the ML model is a combination of network and demand parameters for radio network nodes selected in the wireless communication network, and wherein output of the ML model is a set of parameter values for each radio network node attaining a state of low energy consumption while maximizing demand requirements.

17. The network node according to claim 11, wherein the operations further comprise:

detect a mobility pattern in the wireless communication network; and select the ML model used in calculating the configuration based on the detected mobility pattern.

18. The network node according to claim 11, wherein the operations further comprise:

send the calculated configuration to the radio network nodes.

*  *  *  *  *